(12) United States Patent
Lagnado et al.

(10) Patent No.: US 12,738,970 B2
(45) Date of Patent: Sep. 15, 2026

(54) ELECTRONIC DEVICE TRANSIT MODE

(71) Applicant: Hewlett-Packard Development Company, L.P., Spring, TX (US)

(72) Inventors: Isaac Lagnado, Spring, TX (US); Christopher Charles Mohrman, Spring, TX (US); Steven Harold Petit, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 517 days.

(21) Appl. No.: 18/263,114

(22) PCT Filed: Feb. 18, 2021

(86) PCT No.: PCT/US2021/018526

§ 371 (c)(1),
(2) Date: Jul. 26, 2023

(87) PCT Pub. No.: WO2022/177565

PCT Pub. Date: Aug. 25, 2022

(65) Prior Publication Data

US 2024/0088936 A1 Mar. 14, 2024

(51) Int. Cl.
*H04B 1/401* (2015.01)

(52) U.S. Cl.
CPC .................................... *H04B 1/401* (2013.01)

(58) Field of Classification Search
CPC ..................................................... H04B 1/401
See application file for complete search history.

(56) References Cited

U.S. PATENT DOCUMENTS

| | | | | |
|---|---|---|---|---|
| 7,986,238 | B2 | 7/2011 | Cho | |
| 8,781,493 | B2 | 7/2014 | Mahalingam | |
| 9,020,536 | B1 | 4/2015 | Crossno et al. | |
| 12,045,846 | B1 * | 7/2024 | Tilly | G06Q 30/0201 |
| 2013/0052965 | A1 | 2/2013 | Meylan et al. | |
| 2013/0109323 | A1 * | 5/2013 | Ruutu | H04W 52/0225 455/68 |
| 2014/0018033 | A1 | 1/2014 | Luna | |
| 2015/0324742 | A1 | 11/2015 | Herjólfsson et al. | |
| 2016/0300183 | A1 | 10/2016 | Berger et al. | |
| 2017/0339596 | A1 | 11/2017 | Backholm et al. | |
| 2018/0173401 | A1 * | 6/2018 | Kim | G06F 3/04815 |
| 2019/0274091 | A1 | 9/2019 | Tang | |

* cited by examiner

*Primary Examiner* — Nguyen T Vo
(74) *Attorney, Agent, or Firm* — Quarles & Brady LLP

(57) ABSTRACT

In one example in accordance with the present disclosure, an electronic device is described. An example electronic device includes a processor to place the electronic device in a transit mode. When in the transit mode, the processor is placed in an inactive state. The example electronic device also includes a wireless module. An example wireless module includes a wireless controller to, when in the transit mode, periodically activate a wireless transceiver of the electronic device. The example wireless module also includes the wireless transceiver to, when in the transit mode 1) connect to a wireless network and 2) transmit configuration information for the electronic device.

20 Claims, 4 Drawing Sheets

Fig. 4

ELECTRONIC DEVICE TRANSIT MODE

BACKGROUND

Electronic devices are used by millions of people daily to carry out business, personal, and social operations. Examples of electronic devices include desktop computers, laptop computers, all-in-one devices, tablets, smartphones, wearable smart devices, home automation devices, and gaming systems to name a few. While particular reference is made to a few types of electronic devices, there are innumerable types of electronic devices to which the current specification may apply.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 4 depicts a non-transitory machine-readable storage medium for transmitting electronic device configuration information, according to an example.

Figure 1:
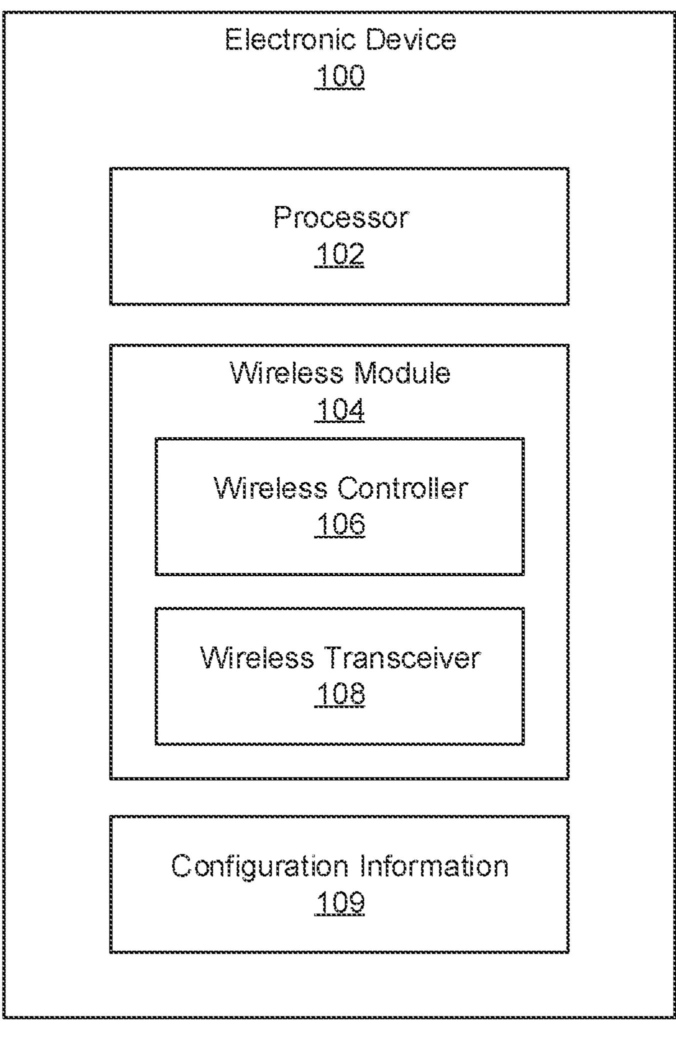
FIG. 1 is a block diagram of an electronic device to manage configuration information transmission when in a transit mode, according to an example.
Figure 1:
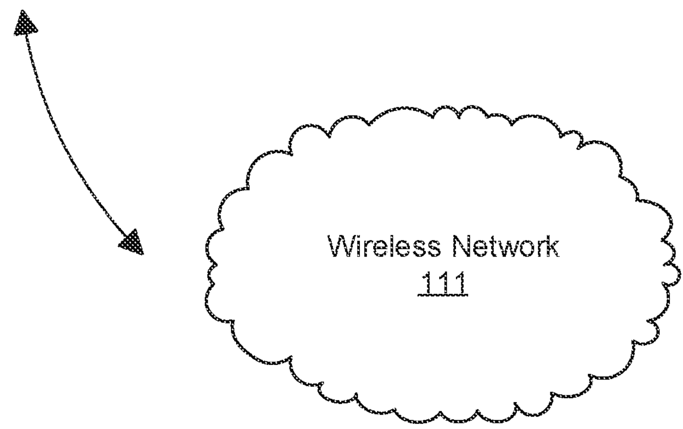

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Electronic devices are found everywhere in modern society and are used by tens and hundreds of millions of users every day. Examples of electronic devices include desktop computers, laptop computers, all-in-one devices, tablets, smartphones, wearable smart devices, home automation devices, and gaming systems to name a few. While particular reference is made to a few types of electronic devices, there are innumerable types of electronic devices to which the current specification may apply. In general, these electronic devices are built in one or multiple facilities and then shipped worldwide to any number of retailers who distribute the electronic devices to the consuming public.

In general, it may be desirable for a producer/manufacturer and even a retailer to have more information and control over the product while it is at some stage along the supply chain. For example, it may be the case that at a particular transfer station, products may be unintentionally or carelessly left on a shelf for a long period of time. This is indicative of ineffective product distribution. As the electronic device may be outside of the manufacturer physical facility, the manufacturer may be unaware of this delay.

As another example, it may be the case that a particular electronic device program code has been updated since the electronic device was shipped. Again, as the product has already left the manufacturing facility, it may be too late to update the program code such that a consumer is either left with an out-of-date product, or is left to perform the updates themselves. While particular reference is made to a few specific instances where a lack of control/information over products along the distribution or supply chain may complicate product performance and distribution, additional control and information may result in a better electronic device in a variety of circumstances.

Accordingly, the present specification describes an electronic device that has a wireless module. When the electronic device leaves a factory, it is put in a transit mode where the main processor is inactive. However, the wireless module of the electronic device may be periodically activated so as to connect to a wireless network and report various types of configuration information such as the electronic device geographic location. As demonstrated below, the information transmitted by the electronic device may vary.

In an example, when the electronic device is activated by a user, for example when a user turns on the electronic device, the processor may switch the electronic device from the transit mode and place it in a mode operable by a consumer where the processor is fully active and configuration information is no longer transmitted automatically. As such, rather than including an independent tracking device to be placed in a shipment or container, the current electronic device provides supply chain tracking directly with an integrated wireless transceiver of the electronic device.

Specifically, the present specification describes an electronic device. The electronic device includes a processor to place the electronic device in a transit mode. When in the transit mode the processor is placed in an inactive state. The electronic device also includes a wireless module. The wireless module includes a wireless controller to, when in the transit mode, periodically activate a wireless transceiver of the electronic device. The wireless module also includes a wireless transceiver. When in the transit mode, the wireless transceiver 1) connects to a wireless network and 2) transmits configuration information for the electronic device.

In another example, the electronic device includes the processor and wireless module as described above. In this example, the wireless transceiver connects to a wireless network and transmits configuration information for the electronic device as described above. In this example, the wireless transceiver also receives a command for the processor of the electronic device. In this example, the wireless controller periodically activates the wireless transceiver of the electronic device to connect to the wireless network. The wireless controller may also, based on a received command, activate the processor and transmit the command.

The present specification also describes a non-transitory machine-readable storage medium where the term "non-transitory" does not encompass transitory propagating signals. The non-transitory machine-readable storage medium is encoded with instructions executable by a processor of an electronic device to, when executed by the processor, cause the processor to: place an electronic device in a transit mode, wherein when in the transit mode the processor is placed in an inactive state and map the electronic device to a supply chain account to record a transaction with the electronic device while in the transit mode. The instructions are also executed to 1) periodically activate a wireless transceiver of the electronic device, 2) connect, via the wireless transceiver, the electronic device to a wireless network, and 3) transmit configuration information for the electronic device via the wireless network. The instructions are also executable to record a transaction to the supply chain account and, responsive to an activation trigger of the electronic device, 1) place the electronic device in a consumer mode and 2) delete a mapping of the electronic device to the supply chain account.

As used in the present specification, describes "configuration information" refers to information relating to the operation, distribution, or manufacture of an electronic device. The configuration information may include supply chain information and operational information among other types of information.

Accordingly, as used in the present specification and in the appended claims, the term "supply chain information" refers to information regarding the distribution and manufacture of an electronic device. Examples of supply chain information include a geographic location of the electronic device along the supply chain, a stage the electronic device is at along the supply chain, diagnostic information, test result information, supplier information, vendor information, an operation being performed on the electronic device, an estimated delivery date for the electronic device, a duration the electronic device has been at a current geographic location and/or stage, and notes entered along the supply chain, among others. In one example, the supply chain information may include sensor output such as vibration output, and/light, humidity, or temperature measurements. Such sensor output may indicate handling conditions throughout the supply chain route. While particular reference is made to particular types of supply chain information. Other types of supply chain information may be implemented in accordance with the principles described herein.

As used in the present specification and in the appended claims the term, "operational information" refers to information associated with the operation of the electronic device. Examples of operational information include a hardware inventory for the electronic device, program code versions for the electronic device, a serial number for the electronic device, a model type of the electronic device, program code identifiers, operating system information, applications, and hardware device monitoring program code, among others. While particular reference is made to particular types of operational information, other types of operational information may be implemented in accordance with the principles described herein.

As used in the present specification and in the appended claims, the term, "controller" may be a processor, an application-specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

Turning now to the figures, FIG. 1 is a block diagram of an electronic device 100 to manage configuration information 109 transmission when in a transit mode, according to an example. As described above, the electronic device 100 may be of a variety of types including a desktop computer, a laptop computer, an all-in-one-device, a tablet, a smart phone, a wearable smart device, a home automation device, a gaming system or any other electronic device 100. While particular reference is made to a few types of electronic devices, there are innumerable types of electronic devices to which the current specification may apply.

The electronic device 100 may include a processor 102. The processor 102 is to execute any number of applications on the electronic device 100. For example, the processor 102 may be a central processing unit (CPU) that executes instructions to run applications on the electronic device 100. In the present electronic device 100, the processor 102 puts the electronic device 100 in a transit mode. That is, at different stages including through all stages of the supply chain and consumer use, the electronic device 100 may be put in different modes. When in use by a consumer, the electronic device 100 may be in a consumer mode where a full complement of the electronic device 100 hardware systems is available for use. Before the electronic device 100 is in the hands of a purchasing consumer, it may be in a transit mode. In this transit mode, less than all of the functionality of the hardware components may be activated. For example, a battery of the electronic device 100 in transit mode may be charged to half capacity. As another example, in a transit mode the processor 102 of the electronic device 100 may be initially placed in an inactive state such that it does not draw power from the battery and does not execute any operations that may generate heat while along the supply chain route.

Also, in this transit mode, the wireless module 104 of the electronic device 100 may operate differently than when in a full consumer mode. The wireless module 104 may include components that allow the electronic device 100 to communicate wirelessly with other electronic devices. In some examples, the wireless module 104 may be able to communicate even when the processor 102 and other hardware components of the electronic device 100 are inactive such as when in the transit mode.

As such, the wireless module 104, which facilitates this wireless communication, includes a wireless transceiver 108. In an example, an electronic device 100 includes different types of wireless transceivers 108 to communicate via different wireless networks 111. For example, a wireless transceiver 108 may communicate via a BLUETOOTH network which is a low-power short-range wireless network that allows for transfer of small amounts of data over short ranges. As another example, a wireless transceiver 108 may communicate via a wireless wide area network (WWAN) network. As yet another example, the wireless transceiver 108 may communicate via a wireless local area network (WLAN) network. While particular reference is made to a few types of wireless networks 111, a variety of types of wireless networks 111 may be implemented in accordance with the principles described herein.

The wireless module 104 also includes a wireless controller 106 to, when in the transit mode, periodically activate the wireless transceiver 108. That is, the wireless transceiver 108 operates to connect to a wireless network 111 and transmit configuration information 109 for the electronic device 100. The wireless controller 106 includes hardware components, such as a separate processor and memory, to facilitate that wireless connection and data transmission. Specifically, this wireless controller 106 may include hardware components to turn the wireless transceiver 108 on and off at certain time periods. The processor of the wireless controller 106 includes the circuitry to retrieve executable code from the memory and execute the executable code.

As such, the wireless module 104 refers to hardware components and associated program code that can connect to a wireless network 111 even when other components, such as a processor 102 of the electronic device 100, are turned off. With such a wireless module 104, the electronic device 100 may still be connected via a wireless network 111.

As described above, the wireless controller 106 may periodically activate the wireless transceiver 108. In one example this may include toggling the power to the wireless transceiver 108, for example by periodically interrupting a connection between a power supply and the wireless transceiver 108.

In another example, the wireless transceiver 108 may have a continuous connection with the power supply and the wireless controller 106 may selectively activate the wireless transceiver 108 in other ways. For example, the wireless controller 106 may switch the wireless transceiver 108 between high and low power states. In this example, the wireless transceiver 108 and wireless module 104 in general are not turned off, but are placed in a state that draws a minimal amount of power. Depending on the type of wireless module 104, the mechanism a wireless controller 106 implements to effectuate this low power state may vary.

For example, if the wireless module 104 is a WWAN module, there are protocols that allow the wireless transceiver 108 to enter a low sleep state. The wireless transceiver 108 may be woken at agreed upon intervals to exchange data or see if there is any data pending. For example, category M (CAT-M) devices may use a power saving mode (PSM) or extended discontinuous reception (eDRX) protocols depending on target intervals and battery usage. While particular reference is made to a few protocols for a particular type of wireless module 104, similar modes may exist for other wireless modules such as Wi-Fi modules and BLUETOOTH modules.

As such, the wireless transceiver 108 may go into a sleep state for a period of time, for example 1-2 days, and upon awakening may communicate with a remote server to transmit the information and in some cases to receive the information. In these examples, a remote server may be aware of the periodicity of the wireless transceiver 108 of the electronic device 100 and may schedule receipt of the data from the wireless transceiver 108 and may also prepare data to send to the wireless transceiver 108. In other examples, the remote server is unaware of the lack of connection of the wireless transceiver 108 from the wireless network 111. In this example, the remote server data request may be queued up by the wireless network 111 until the wireless transceiver 108 wakes and connects to the wireless network 111.

In some examples, such a selective activation may be periodic. For example, the wireless module 104 may activate the wireless transceiver 108 one minute every hour, or one minute every 24 hours. While particular reference is made to particular periods, the wireless module 104 may activate the transceiver 108 according to any selected period.

In summary, in this example the wireless module 104 is still provided power by the electronic device power supply. However, the wireless controller 106, and not the processor 102 which is inactive, handles the power state of the wireless module 104. For example, during an idle state, the wireless module 104 and network negotiate an efficient power contract for the future, such that for example they are synchronized for the next time cycle the wireless module 104 should wake up its wireless transceiver 108 and check for any pending messages from the network.

By periodically activating the wireless transceiver 108, power is conserved as the wireless transceiver 108 is not continuously active. Moreover, as it may be the case that the electronic device 100 is in packaging material, intermittent activation of the wireless transceiver 108 facilitates continual access to, and control over, the electronic device 100, all while keeping the electronic device 100 within a target temperature range. That is, were the electronic device 100 in a fully active state, it may generate heat and draw down the battery, such that the performance of the electronic device 100 upon receipt by a consumer may be impacted and that the components, being improperly ventilated, may become damaged. In addition, the periodic activation of the wireless transceiver 108 may also provide for an extended amount of time that the electronic device 100 can be accessed during transit. That is, when the electronic device 100 is packaged it has no ability to recharge its battery and depends upon a single charge of the battery to last for the entire period of transit until it is purchased and opened by the user. Accordingly, a periodic activation of the wireless transceiver 108, rather than a wireless transceiver 108 that is continuously activated, extends the amount of time the battery charge may last.

As described above, when active in the transit mode, the wireless transceiver 108 may connect to a corresponding wireless network 111 and may transmit configuration information 109. As defined above, the configuration information 109 refers to information relating to the operation, distribution, or manufacture of an electronic device. The configuration information 109 may include supply chain information and operational information among other types of information.

In one particular example, the configuration information 109 includes supply chain information which includes information relating to the distribution and manufacture of an electronic device 100. Examples of supply chain information include a geographic location of the electronic device 100 along the supply chain, a stage the electronic device 100 is at along the supply chain, diagnostic information, test result information, supplier information, vendor information, an operation being performed on the electronic device 100, an estimated delivery date for the electronic device 100, a duration the electronic device 100 has been at a current geographic location and/or stage, and notes entered along the supply chain, among others.

In one particular example, the supply chain information identifies a location of the electronic device 100. This information may be useful in projecting a delivery date/time of the electronic device 100 to a retailer or end user. This information may also be useful to enhance the supply chain efficiency. For example, it may be that the electronic device 100 is held up at a particular facility, or that a particular facility has a tendency to hold on to electronic devices 100, for more than a desired amount of time. In this example, an administrator of the electronic device 100 may take any number of remedial actions to address the delay.

In one example, the supply chain information may include sensor output such as vibration output, and/light, humidity, or temperature measurements. As described above, such sensor output may indicate handling conditions throughout the supply chain route. As a particular example, humidity may affect the operation of the electronic device 100. Accordingly, based on humidity sensor output information, a manufacturer may alter a supply chain route to avoid locations where the electronic device 100 is exposed to excess humidity. While particular reference is made to particular types of supply chain information, other types of supply chain information may be implemented in accordance with the principles described herein.

The configuration information 109 may also include operational information for the electronic device 100, which operational information refers to information associated with the operation of the electronic device 100. Examples of operational information include a hardware inventory for the electronic device 100, program code versions for the electronic device 100, a serial number for the electronic device, a model type of the electronic device, program code identifiers, operating system information, applications, and hardware device monitoring program code, among others. While particular reference is made to particular types of operational information, other types of operational information may be implemented in accordance with the principles described herein.

In some examples, this information may trigger a remote server to transmit a command to the electronic device 100. For example, after an electronic device 100 has been manufactured and as it is in transit to a retailer, a manufacturer may develop a new battery management application, or learn that an existing battery management application has a defect. In this example, the remote server may receive operational information for the electronic device 100 from the wireless transceiver 108 which indicates the outdated battery management application. In this example, the remote server may transmit an update or replacement battery management application. Doing so may allow for the electronic device 100 to be updated while in transit, such that the end user receives an up-to-date product and is not burdened with executing the updates themselves after opening the product.

In such an example, the wireless module 104 may have additional functionality on top of periodic activation of a wireless transceiver 108 and transmission of configuration information 109. Specifically, the wireless module 104 may facilitate two-way communication with the remote server. Accordingly, the wireless transceiver 108 may receive a command from the remote server that is intended for the processor 102 of the electronic device 100. For example, as described above, a manufacture may develop a new battery management application after the electronic device 100 has left the manufacturing facility and would like to send the new application to the electronic device 100 before it is provided to an end user. In this example, the wireless transceiver 108 receives a command to activate the processor 102 such that the new application may be received and installed on the electronic device 100.

While the wireless controller 106 may have its own memory and processor, these components may generally facilitate interaction with a wireless network 111. However, to execute a command, the processor 102 of the electronic device 100 may be activated. Accordingly, the wireless controller 106 may include hardware components to, based on a received command, activate the processor 102 and transmit the command. In such an example, the wireless module 104 may be connected to the processor 102, for example via an inter-integrated circuit (I2C) connection or via a dedicated connection such as a general-purpose input/output (GPIO) pin to the processor 102. As such, based upon a received command, the wireless controller 106 may execute a wake request through this connection and transmit the command to the processor 102 for execution. In such an example, the command may include the instruction for the wireless controller 106 to issue the wake request. Once a command is executed, the processor 102 may return the electronic device 100 to the transit mode where the processor 102 returns to the inactive state.

The command may take a variety of forms. For example, the command may be an update to the program code for the electronic device 100. For example, as described above, a manufacturer or other administrator may desire to push a program code update to the electronic device 100 even during transit and may do so by transmitting a command to the wireless transceiver 108 to activate the processor 102 to execute a particular update operation. As described above, following completion of the update the processor 102 may, responsive to instruction in the command, return the electronic device 100 to a transit mode where electronic device 100 components, such as the processor 102, are de-activated. Once de-activated the operation of the wireless controller 106 to periodically activate the wireless transceiver 108 to transmit configuration information 109 and receive any potential commands may resume.

In another example, the command maybe an end-user initiated provisioning command. For example, an electronic device 100 may be purchased online such that a user has paid for the electronic device 100 before receiving it. In this example, a customer may pre-provision the electronic device 100, for example by loading and/or updating certain hardware program code or other program code on the electronic device 100. Accordingly, in this example, the remote server may send a command to the electronic device 100 advising the electronic device 100 of the provisioning command from the user. Accordingly, in this example the wireless controller 106 may either wake up the processor 102 to execute the end-user initiated provisioning command, or may store the command such that upon activation of the electronic device 100, i.e., the user turns the electronic device 100 on upon receipt, the processor 102 executes the command for example by updating or loading different applications and/or hardware program code.

Accordingly, in this example where the wireless transceiver 108 transmits configuration information 109 and receives commands and the wireless controller 106 activates the processor 102 to execute a command, the electronic device 100 provides bi-directional control, in a low-power fashion, to record configuration information 109 such as supply chain information and operational information and also has the ability to adjust operational characteristics of the electronic device 100, even when the electronic device 100 has left physical control of the manufacturer and not yet reached the hands of the end user.

Figure 2:
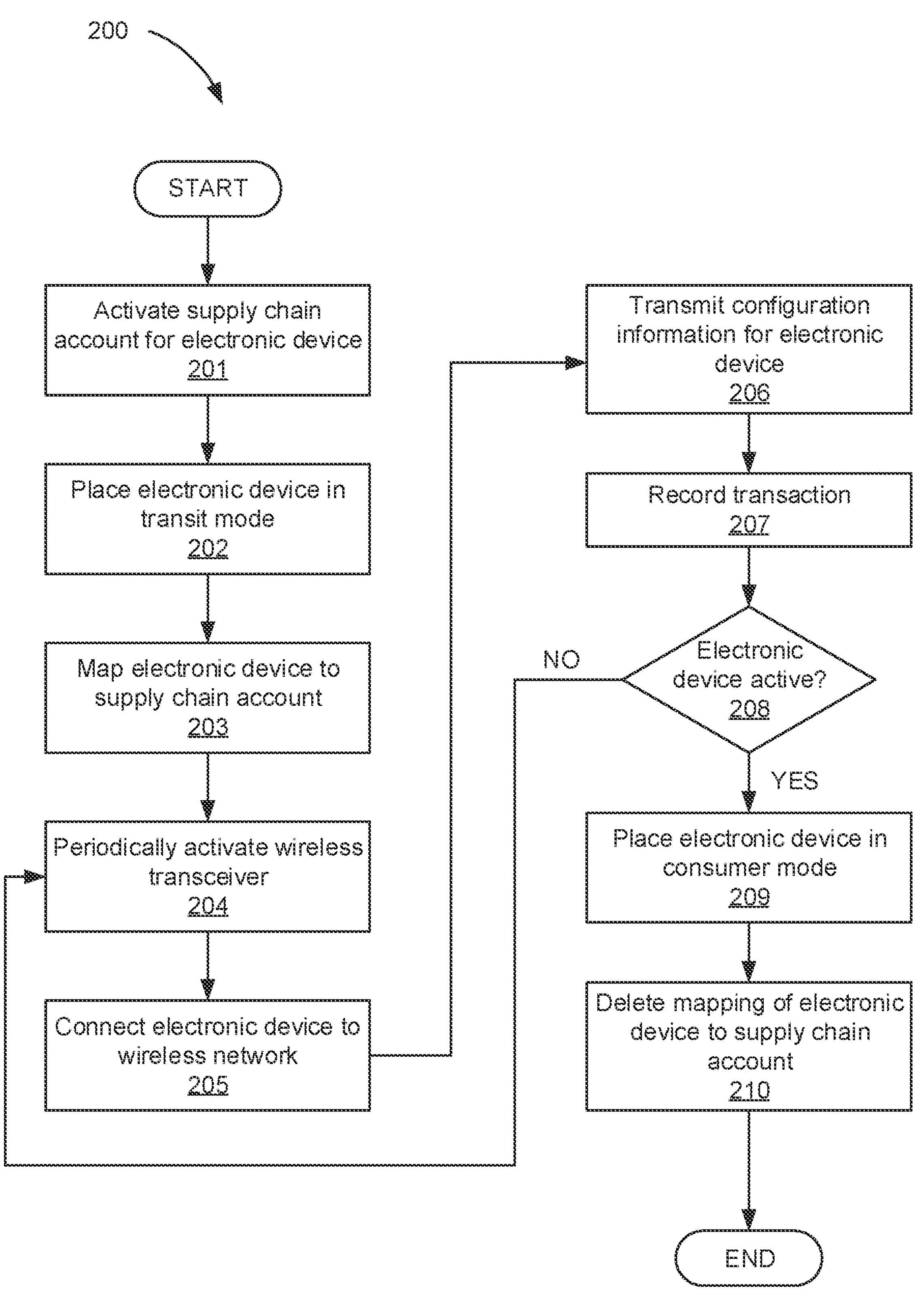
FIG. 2 is a method of transmitting electronic device configuration information when in a transit mode, according to an example.

FIG. 2 is a method 200 of transmitting electronic device 100 configuration information 109 when in a transit mode, according to an example. At step 201, the method 200 includes activating a supply chain account for the electronic device 100. This supply chain account may refer to an entry in a database where information regarding data transmissions between the electronic device 100 and a remote server are recorded. For example, each time the electronic device 100 transmits location information, that information may be recorded to an associated supply chain account. As such, the supply chain account may be indexed and identified by the electronic device 100 to which it is mapped. In some examples, this activation may occur as the electronic device 100 leaves a manufacturing facility and enters the distribution chain. In some examples, such an account may include default operational information for the electronic device such as hardware component identification, program code version, etc.

At step 202, the method 200 includes placing the electronic device 100 in a transit mode. As described above, in the transit mode, certain components of the electronic device 100, such as the processor 102, are in an inactive state. In this example, the wireless module 104 may be powered, but may cycle between low-power states and high-power states periodically to facilitate the transmission and receipt of information as described above. At step 203, the method 200 includes mapping the electronic device 100 to the supply chain account. Based on such a mapping, information transactions may be recorded. For example, each hour the electronic device 100 may transmit its location, which location is recorded and mapped to the supply chain account such that the supply chain account includes an hourly-based timeline of the electronic device 100 route through the distribution chain.

At step 204, the method 200 includes periodically activating the wireless transceiver 108. When active, the wireless transceiver 108 can both transmit configuration information 109 and can receive any pending transmissions, such as commands directed to the processor 102. In some examples, the periodicity may be user defined and may be regular. For example, one minute every 1 hour or one minute every 24 hours.

At step 205 the method 200 includes connecting the electronic device 100 to a wireless network 111. That is, once activated, the wireless transceiver 108 may engage in a pairing process with a remote server via a wireless network such as a BLUETOOTH network, a WWAN network, or a WLAN network.

At step 206, the method 200 includes transmitting configuration information 109 for the electronic device 100. That is, as described above, the electronic device 100 may transmit data relating to the manufacture, distribution, and/or operation of the electronic device 100 to the remote server such that this information is available for use and action by an administrator or end user.

At step 207, the method 200 includes recording the transaction. That is, a record is made indicating that information was exchanged, and in some examples, may identify the information that was exchanged. Accordingly, in this example, additional information is available to control the manufacture, distribution, and/or operation of the electronic device 100 before it is in the hands of an end user.

At step 208, the method 200 includes determining whether the electronic device 100 is active. As used in the present specification and in the appended claims, the term "active" indicates that the electronic device 100 is under the control of the end user and no longer under the control of the manufacturer, distributor, or retailer. If the electronic device 100 is not active, 208 determination NO, the method 200 returns to step 204 where periodic activation/transmission continue.

There are a number of ways to determine whether the electronic device 100 is active. That is, there may be a number of activation triggers that indicate the electronic device 100 is under the control and responsibility of an end user. In one example, the activation trigger is the opening of an electronic device 100, such as a laptop, in which the physical action of opening the hinge of the display device cause the activation trigger to occur. For example, a laptop may be opened after a user purchases the laptop to initiate its use. Another example of an activation trigger is when a user connects the electronic device 100 to an electrical outlet or when the user depresses a power button of the electronic device 100. Responsive to such an activation, 208 determination YES, a number of operations may occur. Specifically, activation of the electronic device 100 indicates that the electronic device 100 is in the consumer's hand and that the electronic device 100 may therefore be taken out of the transit mode. Put another way, the activation of the electronic device 100 may activate the processor 102 such that the electronic device 100 is no longer in a transit mode.

Such activation may trigger a number of actions. For example, at step 209, the method 200 includes transitioning the electronic device 100 from an administrator mode to a consumer mode. That is, while in the transit mode certain administrative tasks, such as certain access rights may be granted. This is appropriate as while in the transit mode the electronic device 100 remains under the control of a manufacturer, retailer, or distributor. Accordingly, when under the control of the end user, it may be desirable to remove certain of these access rights and provide consumer mode access rights, which may include more, less, or different access to the electronic device 100 components.

Responsive to the activation of the electronic device 100, the processor 102 may de-provision the wireless module 104 until a user activation request is received. That is, when in the transit mode, without any user input, the wireless module 104 may operate to automatically transmit and receive information such that the electronic device 100 is tracked. However, for security purposes, upon transition of ownership and responsibility of the electronic device 100 to the end user, it may be desirable to conclude the tracking of the electronic device 100. Accordingly, placing the electronic device 100 in a consumer mode may include resetting or de-activating the wireless transceiver 108.

Note that the wireless transceiver 108 may be re-activated based upon a user request. That is, responsive to the activation trigger for the electronic device 100, the wireless transceiver 108 may be de-activated. However, following activation at a later stage of electronic device 100 setup, the electronic device 100 may prompt the user to activate the wireless module 104 such that consumer mode wireless communications may be carried out.

In an example where a received command included an end-user initiated provisioning command, the end-user initiated provisioning command may be executed upon electronic device 100 activation. That is, as described above, an end-user initiated provisioning command, or any update command, may be received in transit mode. At the time of receipt, if the processor 102 is not woken up, the command may be stored for later use. Accordingly, upon activation of the electronic device 100, the command may be retrieved from storage and acted upon.

At step 210, the method 200 includes deleting the mapping between the electronic device 100 and the supply chain account. That is, when in the consumer mode, the supply chain and operational information may no longer be automatically tracked. Moreover, the link of any collected information and the supply chain account may be severed. That is, it may be desirable to maintain the supply chain information and operational information secure and inaccessible to an end user. As such, the supply chain account may be mapped to the electronic device 100, and information stored therein, until the electronic device 100 is activated and in use by an end user, at which point the mapping may be severed. Note that in an example, the collected information may be maintained, but with the mapping severed the information may be inaccessible to an end user.

Figure 3:
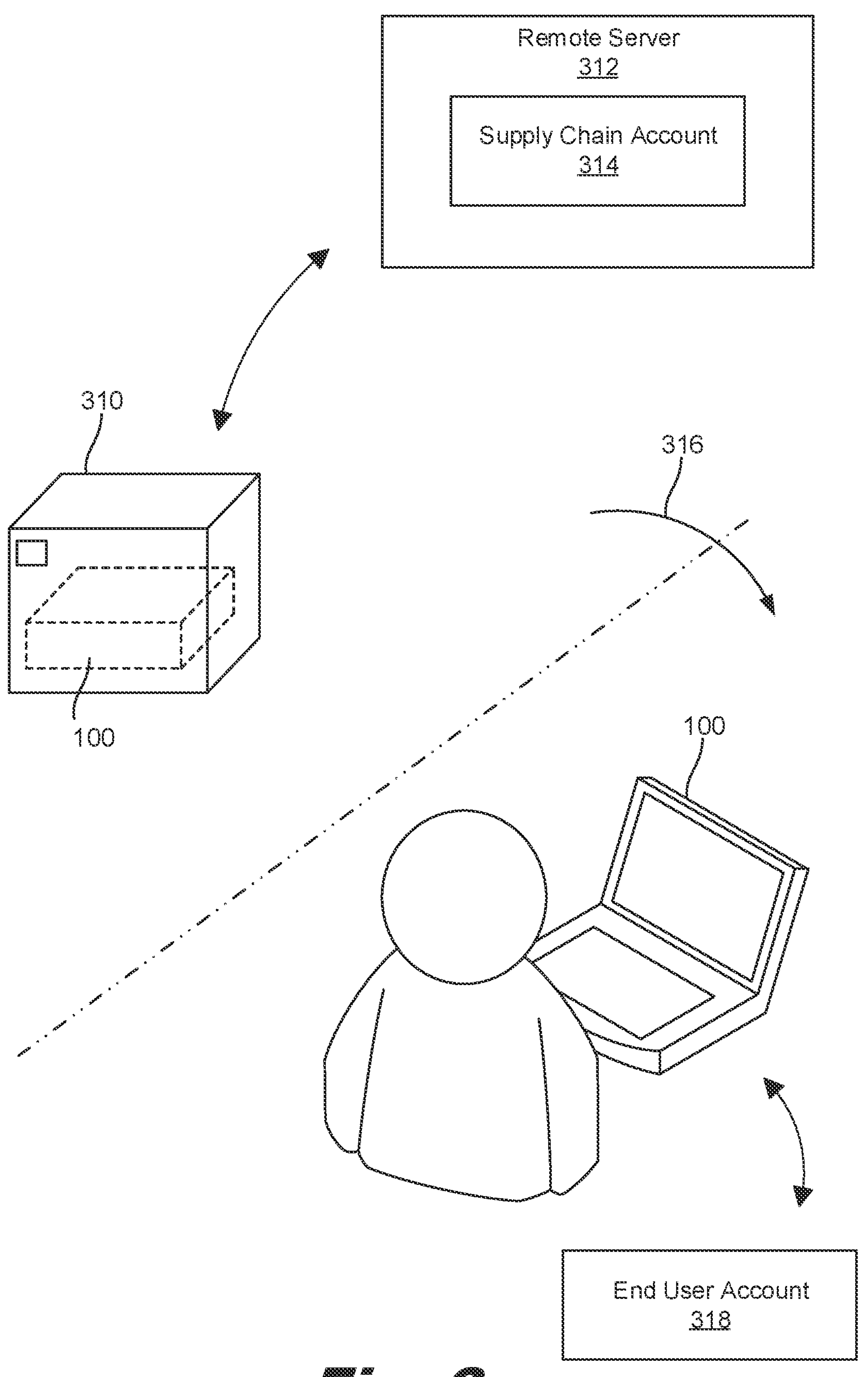
FIG. 3 depicts an environment for transmitting electronic device configuration information when in a transit mode, according to an example.

FIG. 3 depicts an environment for transmitting electronic device 100 configuration information 109 when in a transit mode, according to an example. In this example, the electronic device 100 may be a laptop computer. In this example, while in a supply chain (to the left of the dashed-dot line), the electronic device 100 may be in a transit mode and in some examples may be enclosed in packaging 310. While in this mode, a low-power periodic wireless connection is maintained with a remote server 312 that includes a supply chain account 314, where data transactions to and from the electronic device 100 are stored. When the electronic device 100 passes to control of a user as indicated by the arrow 316, the connection between the electronic device 100 and the supply chain account 314 is severed such that the location of the electronic device 100 is no longer tracked. In this example, the end user may set up an end user account 318, that may or may not be serviced by the same remote server 312 which end user account 318, may be used by the end user for any variety of purposes.

Figure 4:
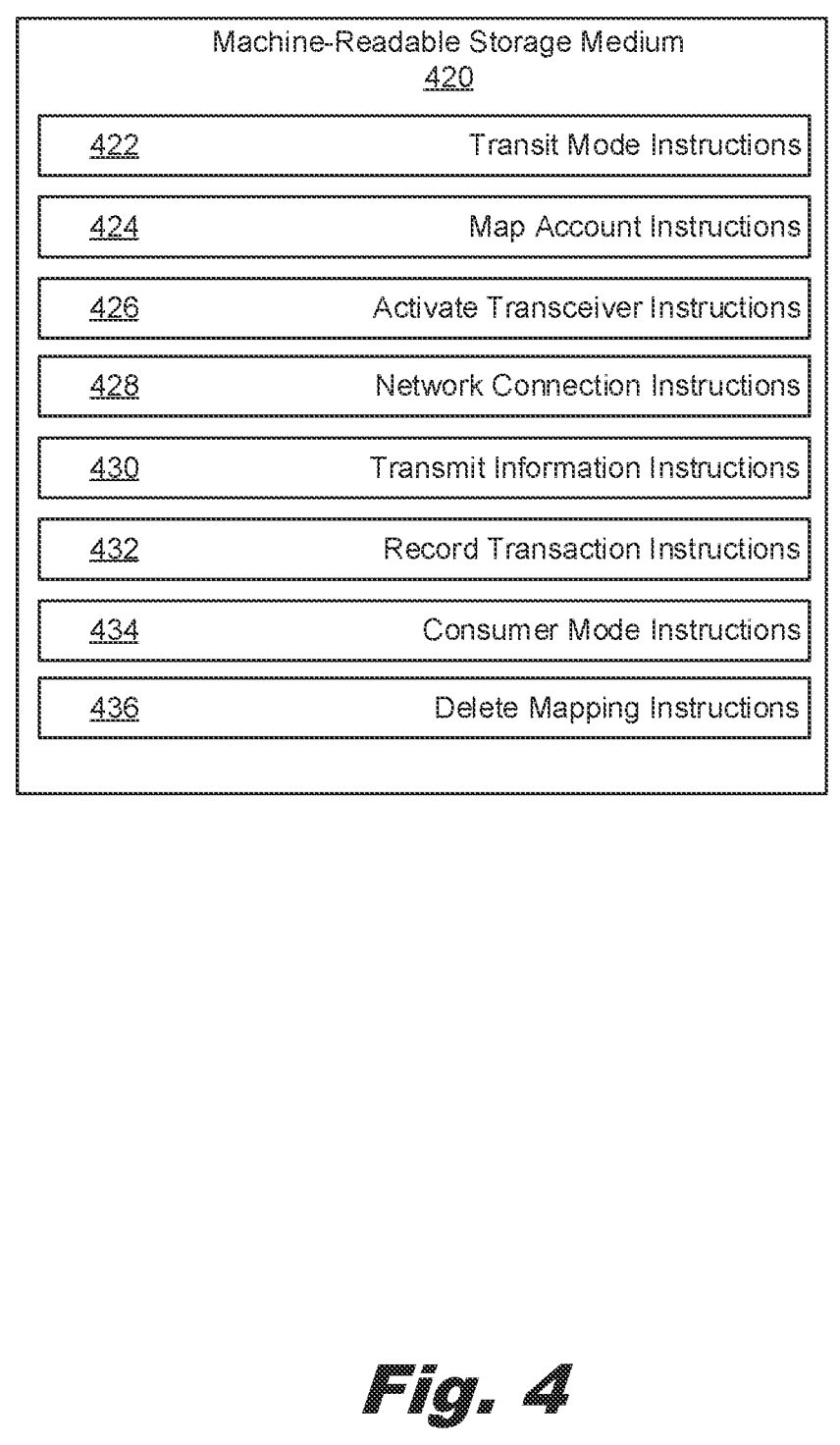

FIG. 4 depicts a non-transitory machine-readable storage medium 420 for transmitting electronic device 100 configuration information 109, according to an example. To achieve its desired functionality, an electronic device 100 includes various hardware components. Specifically, an electronic device 100 includes a processor 102 and a machine-readable storage medium 420. The machine-readable storage medium 420 is communicatively coupled to the processor 102. The machine-readable storage medium 420 includes a number of instructions 422, 424, 426, 428, 430, 432, 434, 436 for performing a designated function. The machine-readable storage medium 420 causes the processor 102 to execute the designated function of the instructions 422, 424, 426, 428, 430, 432, 434, 436. The machine-readable storage medium 420 can store data, programs, instructions, or any other machine-readable data that can be utilized to operate the electronic device 100. Machine-readable storage medium 420 can store computer readable instructions that the processor 102 of the electronic device 100 can process, or execute. The machine-readable storage medium 420 can be an electronic, magnetic, optical, or other physical storage device that contains or stores executable instructions. Machine-readable storage medium 420 may be, for example, Random Access Memory (RAM), an Electrically Erasable Programmable Read-Only Memory (EEPROM), a storage device, an optical disc, etc. The machine-readable storage medium 420 may be a non-transitory machine-readable storage medium 420, where the term "non-transitory" does not encompass transitory propagating signals.

Referring to FIG. 4, transit mode instructions 422, when executed by the processor 102, cause the processor 102 to, place an electronic device 100 in a transit mode, wherein when in the transit mode a processor 102 is in an inactive state. Map account instructions 424, when executed by the processor 102, may cause the processor 102 to, map the electronic device 100 to a supply chain account 314 to record a transaction with the electronic device 100 while in the transit mode. Activate transceiver instructions 426, when executed by the processor 102, may cause the processor 102 to, periodically activate a wireless transceiver 108 of the electronic device 100. Network connection instructions 428, when executed by the processor 102, may cause the processor 102 to, connect, via the wireless transceiver 108, the electronic device 100 to a wireless network 111. Transmit information instructions 428, when executed by the processor 102, may cause the processor 102 to, transmit configuration information 109 for the electronic device 100 via the wireless network 111. Record transaction instructions 432, when executed by the processor 102, may cause the processor 102 to, record the transaction to the supply chain account 314. Consumer mode instructions 434, when executed by the processor 102 and responsive to an activation trigger of the electronic device 100, may cause the processor 102 to, place the electronic device 100 in a consumer mode. Delete mapping instructions 436, when executed by the processor 102 and responsive to an activation trigger of the electronic device 100, may cause the processor 102 to, delete a mapping between the electronic device 100 and the supply chain account 314.

What is claimed is:

1. An electronic device, comprising:
- a processor to place the electronic device in a transit mode, wherein when in the transit mode the processor is placed in an inactive state, wherein the processor is to map the electronic device to a supply chain account to record a transaction with the electronic device while in the transit mode;
- a wireless module comprising:
  - a wireless controller to, when in the transit mode, periodically activate a wireless transceiver of the electronic device; and
  - the wireless transceiver to, when in the transit mode:
    - connect to a wireless network; and
    - transmit configuration information for the electronic device; and
  - responsive to an activation trigger of the electronic device;
  - place the electronic device in a consumer mode; and
  - delete a mapping of the electronic device to the supply chain account.

2. The electronic device of claim 1, wherein the configuration information comprises supply chain information.

3. The electronic device of claim 1, wherein the configuration information comprises operational information for the electronic device.

4. The electronic device of claim 1, wherein the wireless network is selected from the group consisting of:
- a wireless wide area network (WWAN);
- a BLUETOOTH (BT) network; and
- a wireless local area network (WLAN).

5. The electronic device of claim 1, wherein, responsive to electronic device activation, the processor is to transition the electronic device from an administrator mode to the consumer mode.

6. The electronic device of claim 5, wherein placing the electronic device in the consumer mode comprises resetting the wireless transceiver.

7. The electronic device of claim 1, wherein, responsive to electronic device activation, the processor is to de-provision the wireless module until a user activation request is received.

8. An electronic device, comprising:
- a processor to:
  - place the electronic device in a transit mode, wherein when in the transit mode the processor is placed in an inactive state;
  - map the electronic device to a supply chain account to record a transaction with the electronic device while in the transit mode; and
  - execute a command that is received by a wireless controller;
- a wireless module comprising:
  - a wireless transceiver to, when in the transit mode:
    - connect to a wireless network;
    - transmit configuration information for the electronic device; and
    - receive a command for the processor of the electronic device; and
  - the wireless controller to, when in the transit mode:
    - periodically activate the wireless transceiver of the electronic device to connect to the wireless network;

based on a received command, activate the processor and transmit the command; and responsive to an activation trigger of the electronic device:

place the electronic device in a consumer mode; and delete a mapping of the electronic device to the supply chain account.

9. The electronic device of claim 8, wherein the received command is an end-user initiated provisioning command.

10. The electronic device of claim 9, wherein upon electronic device activation, the processor is to execute the end-user initiated provisioning command.

11. The electronic device of claim 8, wherein the received command is an update to program code of the electronic device.

12. The electronic device of claim 8, wherein the configuration information comprises supply chain information.

13. The electronic device of claim 8, wherein the configuration information comprises operational information for the electronic device.

14. A non-transitory machine-readable storage medium encoded with instructions executable by a processor of an electronic device to, when executed by the processor, cause the processor to:

place an electronic device in a transit mode, wherein when in the transit mode the processor is placed in an inactive state;

map the electronic device to a supply chain account to record a transaction with the electronic device while in the transit mode;

periodically activate a wireless transceiver of the electronic device;

connect, via the wireless transceiver, the electronic device to a wireless network;

transmit configuration information for the electronic device via the wireless network;

record a transaction to the supply chain account; and responsive to an activation trigger of the electronic device:

place the electronic device in a consumer mode; and delete a mapping of the electronic device to the supply chain account.

15. The non-transitory machine-readable storage medium of claim 14, wherein placing the electronic device in a consumer mode comprises resetting the wireless transceiver.

16. The non-transitory machine-readable storage medium of claim 14, wherein the activation trigger comprises opening a clamshell electronic device.

17. The non-transitory machine-readable storage medium of claim 14, wherein the activation trigger comprises connecting the electronic device to an electrical outlet.

18. The non-transitory machine-readable storage medium of claim 14, wherein the activation trigger comprises depression of a power button of the electronic device.

19. The non-transitory machine-readable storage medium of claim 14, wherein the configuration information comprises supply chain information.

20. The non-transitory machine-readable storage medium of claim 14, wherein the configuration information comprises operational information for the electronic device.

* * * * *